United States Patent [19]

Chu

[11] Patent Number: 4,816,430

[45] Date of Patent: Mar. 28, 1989

[54] DIELECTRIC CERAMIC COMPOSITION

[75] Inventor: Michael S. H. Chu, Lewiston, N.Y.

[73] Assignee: Tam Ceramics, Inc., Niagara Falls, N.Y.

[21] Appl. No.: 60,042

[22] Filed: Jun. 9, 1987

[51] Int. Cl.$^4$ .............................................. C04B 35/46
[52] U.S. Cl. ..................................... 501/137; 501/138
[58] Field of Search ................. 501/137, 138; 361/321

[56] References Cited

U.S. PATENT DOCUMENTS

| | | | |
|---|---|---|---|
| 4,459,364 | 7/1984 | McSweeney | 501/137 |
| 4,540,676 | 10/1985 | Chu | 501/138 X |

FOREIGN PATENT DOCUMENTS

| | | | |
|---|---|---|---|
| 0200573 | 11/1986 | European Pat. Off. | |
| 0020905 | 2/1984 | Japan | 501/138 |
| 0152265 | 8/1984 | Japan | 501/137 |
| 0154703 | 9/1984 | Japan | 501/137 |
| 0948973 | 8/1982 | U.S.S.R. | 501/137 |

*Primary Examiner*—William R. Dixon, Jr.
*Assistant Examiner*—James M. Hunter, Jr.
*Attorney, Agent, or Firm*—Kenyon & Kenyon

[57] ABSTRACT

Ceramic dielectric compositions having a dielectric constant of between about 3,000 to 4,000; dissipation factors of below about 1.8%, insulation resistance times capacitance products of about 10,000 ohm-farads at 25° C. and above 1,000 ohm-farads at 125° C. and stable temperature coefficient characteristics. In one embodiment, the dielectric constant of the present invention does not vary by more than ±15 percent over a temperature range of −55° C. to 125° C.

11 Claims, No Drawings

DIELECTRIC CERAMIC COMPOSITION

FIELD OF THE INVENTION

This invention relates to a dielectric ceramic composition which has a dielectric constant (K) of between about 3,000–4,000, a dissipation factor (DF) of below about 1.8%, an insulation resistance (R) times capacitance (C) product (RC) of about 10,000 ohm-farads at 25° C. and above about 1,000 ohm-farads at 125° C., and stable temperature coefficient characteristics. In one embodiment, the dielectric constant of the ceramic composition of the present invention does not vary by more than ±15 percent over a temperature range of from −55° C. to 125° C.

BACKGROUND OF THE INVENTION

Because of their high dielectric constants, low dissipation factors, high insulation resistance times capacitance products and stable temperature coefficients, the ceramic compositions of this invention are useful in manufacturing multilayer ceramic capacitors (hereinafter MLC) which require a high capacitance and which typically have a small physical size. MLC's are commonly made by casting or otherwise forming insulating layers of dielectric ceramic powder upon which conducting metal electrode layers, usually consisting of a palladium/silver alloy, are placed. The material is then densified by firing to form the MLC. Barium titanate ($BaTiO_3$) is frequently used in the formation of MLC's due to its high dielectric constant. The stability of the dielectric constant of the MLC over a wide range of temperatures, however, and its insulation resistance, are also important factors to be considered in selecting ceramic compositions for use in MLC's. The electrical properties of dielectric ceramic compositions vary substantially with temperature increases or decreases. For example, the insulation resistance of ceramic compositions may vary substantially with grain size after final sintering.

It is known to produce a temperature stable MLC by firing $BaTiO_3$ together with minor oxide additives for controlling the final dielectric properties. Ceramic compositions having dielectric constants between about 3000 to about 4700 at 25° C. have been disclosed which have flat TC characteristics and in which the dielectric constant does not vary more than ±15 percent from the reference value at 25° C. The dissipation factors of these known ceramic composition, however, are approximately 2.0% and their RC product is between about 3000 to about 4000 ohm-farads at 25° C. Although these electric parameters meet the requirements described in most industrial specifications (e.g., EIA-RS198C, IEC-384-10, and JIS-RC-3698, which require an RC value of greater than 1000 ohm-farads at 25° C. and higher than 100 ohm-farads at 125° C.) it has been found that when the materials are used in large scale MLC manufacturing it is not possible to achieve such dissipation and RC factors.

In many cases, MLC's are further processed with solder coating, barrier layer plating, lead attachment and epoxy coating to produce finished products. These processes increase the dissipation factors and reduce the RC product. Finished MLC's made with the materials disclosed in the prior art often have electric properties which are much less favorable than those of the ceramic compositions from which they are made. These factors limit the production yields for MLC's and also increase the manufacturing cost per device.

The need exists, therefore, for a dielectric ceramic composition useful in MLC applications which evidences a stability of the dielectric constant over a wide temperature range. Ideally, the dielectric constant of such a ceramic composition would not change from its base value at 25° C. by more than about ±15 percent over a temperature range of from −55° C. to 125° C. The RC product of such composition would preferably be more than 1000 ohm-farads at 25° C. and more than 100 ohm-farads at maximum working temperature, which is 125° C. in most cases.

SUMMARY AND OBJECTS OF THE INVENTION

It is an object of the present invention to provide a ceramic composition suitable for MLC applications which evidences stability of the dielectric constant over a wide temperature range.

It is a further object of the present invention to provide a dielectric ceramic composition having a dielectric constant which does not change by more than ±15% from its base value at 25° C.

It is a further object of the present invention to provide a ceramic composition having the above-stated properties which also has a dissipation factor and RC product that will remain well within industrially acceptable limits during MLC manufacturing processes such as solder coating, barrier layer plating, lead attachment and epoxy coating.

It is still a further object of the present invention to provide an MLC fired with precious metal internal electrodes; such an MLC having a dielectric constant of between about 3000–4000 at 25° C.; a dissipation factor of less than about 1.8%; an RC product of more than about 10,000 ohm-farads at 25° C. and more than about 1000 ohm-farads at 125° C.; and stable TC characteristics such that the dielectric constant does not vary more than about ±15% from its reference value at 25° C.

In accordance with the above-stated objects, a dielectric ceramic composition is disclosed comprised of about 99.63 to about 99.97 weight percent of a ceramic precursor material consisting essentially of about 97.70–98.99 weight percent barium titanate ($BaTiO_3$); about 0.85–1.69 weight percent niobium pentoxide ($Nb_2O_5$); about 0.09–1.20 weight percent cobalt oxide (CoO); about 0.13–0.17 weight percent niobium pentoxide; and about 0.10–0.29 weight percent manganese carbonate ($MnCO_3$) wherein the niobium pentoxide to cobalt oxide weight ratio varies from about 3.3 to 18.0. The MLC's manufactured from the ceramic dielectric compositions of the present invention have very low dissipation factors (less than 1.8%) and very high RC products (greater than 10,000 ohm-farads at 25° C. and 1,000 ohm-farads at 125° C.). These compositions also exhibit flat TC characteristics and their dissipation factors and RC products remain well within industrial specifications during MLC manufacturing processes such as solder coating, barrier layer plating, lead attachment and epoxy coating.

In a preferred embodiment, the ceramic dielectric composition is formed from a mixture of about 99.77 weight percent of a ceramic precusor material consisting essentially of about 98.76 weight percent $BaTiO_3$; about 1.04 weight percent $Nb_2O_5$; about 0.20 weight percent CoO and about 0.13 weight percent $MnCO_3$.

The ceramic compositions of this invention, when formed into MLC's, have dielectric constants which are typically in the range of about 3,000 and 4,000 at 1 KHz; dissipation factors which are typically below about 1.8% percent at 1VRMS; RC products which are typically greater than about 10,000 ohm-farads at 25° C. and 50 VD/mil and greater than 1,000 ohm-farads at 125° C. and 50 VDC/mil; and stable TC characteristics such that the dielectric constants vary by no more than about ±15 percent from their reference value at 25° C. over a temperature range of −55° C. to 125° C.

DETAILED DESCRIPTION OF A PREFERRED EMBODIMENT

A fired ceramic body of the present invention is produced by reacting, during the course of firing, the constituent dielectric oxides of the ceramic preparation, including barium titanates, iobium pentoxide, cobalt oxide, and manganese carbonate, in the proportions set forth above. The reactants may be slurried together in water, or physically blended together. The mixture of the ceramic preparation may be cast into a sheet using standard methods, and formed into a multilayer capacitor structure with internal electrodes comprised, e.g., of 70 percent palladium/30 percent silver, and fired at about 1290° C. to about 1370° C. for about one to four hours.

In a preferred embodiment of the dielectric compositions of the present invention, the RC product is greater than about 10,000 ohm-farads at 25° C. and 50 VDC/mil, and greater than about 1,000 ohm-farads at 125° C. and 50 VDC/mil. The dielectric constants are typically between about 3,000 to 4,000 at 1 KHz and 1 volt rms, the dissipation factors are typically less than 1.8 percent at 1 KHz at 1 volt rms, and the TC characteristics are stable, i.e., the dielectric constants vary by no more than about ±15 percent from their reference value at 25° C.

In one embodiment of the present invention, the barium titanate employed has purity exceeding about 99 weight percent with no individual impurity greater than about 0.5 weight percent. Such high purity barium titanate can be produced via chemical coprecipitation processes and other techniques known in the art (e.g., by reacting high purity $BaCO_3$ with $TiO_2$ powders). The stoichiometry and size of the barium titanate particles can be controlled to produce the dielectric properties of the ceramic composition of this invention.

In a preferred embodiment, the niobium pentoxide used is about 99 weight percent pure, and the preferred cobalt oxide is about 70–74 weight percent pure in terms of metallic cobalt and the preferred manganese carbonate is also about 99 weight percent pure. It is also possible, however, to employ manganese containing salts.

The invention is more particularly illustrated by the following examples.

EXAMPLE 1

Approximately 500 kilograms of a ceramic precursor composition of the present invention were manufactured by uniformly blending approximately 98.76 weight percent of high purity barium titanate ($BaTiO_3$), 1.04 weight percent technical grade, fine particle size niobium pentoxide ($Nb_2O_5$) and 0.20 weight percent technical grade, fine particle size cobalt oxide (CoO) thereby forming a precursor powder. The purity of the barium titanate exceeded 99% with no one impurity exceeding about 0.5%.

Then precursor powders were then further slurried in water with niobium pentoxide ($Nb_2O_5$) and technical grade manganese carbonate ($MnCO_3$) according to the compositions shown in Table 1. After uniform mixing through dry blending and/or ball milling, the slurry was then dried and pulverized. About 400 grams of the uniformly blended ceramic compositions was then charged into a ball mill with ½ inch alumina media together with 218 grams of a binder solution made by uniformly mixing and dissolving 186 grams dioctylphthalate, 90 grams Nuostabe V-1444 (Nuostable V-1444 is an alkali ion free organic solvent dispersing agent available from Nuodex Co. Inc., New Jersey), 2597 ml ethanol and 270 ml toluene, and 372 grams Butvar B-76 vinyl resin (Butvar B-76 is a binder comprising a mixture of polyvinyl butyal, polyvinyl alcohol and polyvinyl acetate available from Monsanto Corp).

It should be noted that any conventional ceramic binder compositions may be used with this invention which are compatible with the other materials used and which provide a vehicle for dispersing the ceramic particles and holding them together when the solvent is removed. Other suitable binder compositions are described in "Ceramic Processing Before Firing", Ch. 19, G. Y. Onoda, Jr., et al., John Wiley and Sons (1978). Polyvinyl alcohol in water and polyvinyl butyal in methyl ethyl ketone/alcohol are examples of other suitable equitable binder compositions.

This slurry was milled for 16 hours, discharged and filtered through a 44 micron screen. The slurry had a viscosity of about 1,500 to 3,000 centipoise and was then deaired and cast, in accordance with standard techniques, into a tape with a thickness of 1.5 mils. The tape was converted into MLC's having internal electrodes comprised of about 70 weight percent palladium/30 weight percent silver by conventional processes well known in the industry. The capacitors were preheated to 260° C. for 48 hours, placed on stabilized zirconia setters and sintered to between 1290° C. to 1370° C. for about one hour to four hours.

The sintered capacitors had 10 active dielectric layers with dielectric thickness ranging from 0.85 to 1.10 mil. Termination electrodes of DuPont Silver paint No. 4822, which is a mixture of silver and glass frit in a binder, were applied at opposite ends of the multilayer capacitor to connect alternate electrode layers, and these capacitors were fired at 815° C. in a tunnel furnace. The capacitance (C), dissipation factor (DF), insulation resistance times capacitance product (RC) at 25° C. and 125° C., and the capacitance change with temperature versus capacitance at 25° C. (TC) were measured with a General Radio 1683 automatic RLC bridge, a Radiometer IM6 megohmmeter, and an Electro Scientific Industries 2110A capacitance bridge with a temperature chamber and computer controlled microprocessor. The capacitance and dissipation factor were measured at 1 KHz measurement frequency. The insulation resistance was measured with DC applied voltage and RC products were calculated. DC breakdown voltage was also measured. The dielectric constant of each sample (K) was then calculated from the fundamental capacitance equation:

$$K = (C \cdot T)/(8.854 \times 10^{-14} L \cdot W \cdot N) \quad (1)$$

where
K = dielectric constant of the sample,
T = thickness of each dielectric layer, in cm.

C = measured capacitance value in farads,
L = fired electrode length in cm.,
W = fired electrode width in cm., and
N = number of active dielectric layers (10).

The dielectric properties of the compositions of the present example are summarized in Table 2. Inspection of these properties illustrate that when MnCO$_3$ is added to the precursor composition, the dissipation factor and RC product of the MLC can be significantly improved. Such improvements cannot be achieved by adding niobium pentoxide alone, as shown by the values for composition 2. The addition of MnCO$_3$ only slightly reduces the dielectric constant, with the TC value still falling within the acceptable ±15% limitation.

TABLE 1

| Composition | Precursor (wt %) | Nb$_2$O$_5$ (wt %) | MnCO$_3$ (wt %) |
|---|---|---|---|
| 1 | 100 | .0 | 0.0 |
| 2 | 99.90 | 0.10 | 0.0 |
| 3 | 99.77 | 0.13 | 0.10 |

Precursor = BaTiO$_3$ (98.76 weight percent) Nb$_2$O$_5$ (1.04 weight percent) CoO (0.20 weight percent)

sample (K) was then calculated from the fundamental capacitance equation:

$$K = (5.66 \cdot C \cdot T)/(D \cdot D) \qquad (2)$$

where
K = dielectric constant of the sample
T = thickness of the disc in inches,
D = diameter of the disc in inches, and
C = capacitance of the disc in pico farads.

The temperature characteristics (TC) of each sample were calculated according to the following equation:

$$TC = [(C_T - C_{25})/C_{25}] \times 100 \qquad (3)$$

where
TC = temperature characteristics in percent,
$C_T$ = capacitance of the sample at temperature T,
$C_{25}$ = capacitance of the sample at reference temperature (25° C).

The dielectric properties of compositions 4-10, summarized in Table 4, demonstrate that when only MnCO$_3$ is added into the precursor composition, such as in com-

TABLE 2

| | 1 KHz, 1 VMRS | | TC (%) | | | | RC (ohm-farad) @ 50 V/mil, 2 min. | | Breakdown |
|---|---|---|---|---|---|---|---|---|---|
| Composition | K | DF (%) | −55° C. | −30° C. | 85° C. | 125° C. | 25° C. | 125° C. | DCV/mil |
| 1 | 4353 | 2.03 | 1.5 | 3.7 | −8.0 | 5.2 | 4320 | 1920 | 833 |
| 2 | 3852 | 1.90 | 2.0 | −0.6 | −5.9 | −1.3 | 2500 | NT | NT |
| 3 | 3970 | 1.60 | 8.1 | 4.4 | −12.9 | −9.9 | 13230 | 1937 | 833 |

EXAMPLE II

Approximately 500 kilograms of a ceramic precursor composition of the present invention was manufactured in accordance with the precedure disclosed in Example 1.

The ceramic precursor material was then mixed with technical grade fine particle size niobium pentoxide (Nb$_2$O$_5$) and technical grade fine particle size manganese carbonate (MnCO$_3$) according to the weight percentage set forth in Table 3.

The ceramic powders were further blended with 15 to 25 cc of distilled water and mixed thoroughly in a high speed Spex model 800-2 paint mixer manufactured by Spec Industries, Inc., New Jersey, for about 10 minutes. The wet slurry was then dried into a cake and ground with a mortar and pestle. About 2.4 to 4.0 cc of a binder solution, including 26 weight percent water, 26 weight percent propylene glycol and 48 weight percent corn syrup, was mixed into the ceramic powder in a mortar and pestle which was then granulated through a 40 mesh nylon screen. Discs of the resultant mixture having a diameter of approximately 1.27 cm and a thickness of approximately 0.1 to 0.15 cm were pressed at a pressure of about 38,000 lbs. per square inch in a stainless steel die. The discs were then placed on a stabilized zirconia setter and fired at a temperature of between 1280° C. to 1370° C. for 1 to 2 hours. After cooling, silver electrodes were painted on the discs which were then fired at 815° C. to sinter the electrodes. The capacitance change with temperature versus capacitance at 25° C. (TC) was then measured with a model ESI2110A capacitance bridge at 1 KHz measurement frequency at a temperature range of from −55° C. to +125° C. at about 20° C. intervals. The dielectric constant of each positions 4 and 5, the TC of the resulting ceramic compositions becomes unstable and exceeds the required ±15% limit. Also, when more than 0.5 weight percent niobium pentoxide and/or more than 0.29 weight percent manganese carbonate are added to the precursor composition, such as in compositions 9, 10 and 11, either the dielectric constants are lower than 3,000, the dissipation factors are very high or the TC value is unstable.

TABLE 3

| Composition | Precursor (wt %) | Nb$_2$O$_5$ (wt %) | MnCO$_3$ (wt %) |
|---|---|---|---|
| 1 | 100 | 0.0 | 0.0 |
| 4 | 99.90 | 0.0 | 0.10 |
| 5 | 99.76 | 0.0 | 0.23 |
| 6 | 99.77 | 0.13 | 0.10 |
| 7 | 99.73 | 0.17 | 0.10 |
| 8 | 99.63 | 0.17 | 0.20 |
| 9 | 99.54 | 0.17 | 0.29 |
| 10 | 99.21 | 0.50 | 0.29 |
| 11 | 98.43 | 0.98 | 0.59 |

TABLE 4

| Composition | 1 KHz, 1 VRMS | | TC (%) | | | |
|---|---|---|---|---|---|---|
| | K | DF (%) | −55° C. | −30° C. | 85° C. | 125° C. |
| 1 | 3960 | 0.92 | −8.2 | −7.3 | −9.3 | 5.0 |
| 4 | 4126 | 1.03 | −24.1 | −20.0 | −9.1 | −11.3 |
| 5 | 3555 | 0.76 | −25.7 | −21.8 | −5.6 | −11.4 |
| 6 | 3580 | 0.86 | −6.3 | −5.2 | −8.0 | 6.9 |
| 7 | 3290 | 0.64 | −4.9 | −5.7 | −7.4 | 7.1 |
| 8 | 3650 | 0.71 | −2.6 | 1.54 | −14.6 | −7.8 |
| 9 | 3000 | 31.3 | −64.9 | −53.3 | 233.8 | −17.2 |
| 10 | 2800 | 8.41 | −1.3 | −2.0 | −8.1 | 10.8 |
| 11 | 2120 | 0.41 | −0.70 | −0.3 | −4.9 | 15.0 |

The values given in the above examples are subject to on factors known in the art. For example, with respect to compositions 1–11, the dielectric constant may be significantly increased and the dissipation factor may be significantly decreased by pulverizing, milling, uniformly dispersing, or otherwise reducing the starting materials to very fine particles. Such practices, which are commonly carried out in the course of manufacturing ceramic capacitors, were not employed to their full extent in the preparation of Compositions 1–11. In addition, variations in firing conditions, sample thickness and preparation, and measurement error may result in differences in the observed values for the same composition. Thus, depending upon manufacturing techniques, and with little regard to particle size, the properties of ceramic compositions made using the proportions given in compositions 1–11 can vary from values given. For example, the dielectric constants may vary by ±100, the dissipation factor may vary by ±0.2 percent, and the capacitance change with temperature versus capacitance at 25° C. may vary by ±1.5 percent.

It is to be understood that the invention is not limited to the illustrations described and shown herein, which are deemed to be merely illustrative of the best mode of carrying out the invention. The invention also encompasses all such modifications which are within the range of the following claims.

What is claimed is:

1. A sinterable ceramic composition comprising about 99.63–99.77 weight percent of a ceramic precursor material consisting essentially of about 98.76 weight percent barium titanate, about 1.04 weight percent niobium pentoxide, and about 0.20 weight percent cobalt oxide, mixed with about 0.13–0.17 weight percent niobium pentoxide and about 0.10–0.29 weight percent manganese carbonate.

2. The ceramic composition of claim 1, wherein the barium titanate has a purity of about 99.0 weight percent, the niobium pentoxide has a purity of about 99.0 weight percent, the cobalt oxide has a purity of about 70.0 to 74.0 weight percent in terms of metallic coalt, and the manganese carbonate has a purity of about 99.0 weight percent.

3. A ceramic composition useful in making multilayer ceramic capacitors which have a dielectric constant that ranges from about 3,000 to about 4,000, a dissipation factor of less than 1.8 percent, an insulation resistance times capacitance product greater than about 10,000 ohm-farads at 25° C. and greater than 1,000 ohm-farads at 125° C., a capacitance which varies by less than plus or minus 15 percent from its reference value at 25° C over a temperature range of −55° C. to 125° C. and consisting essentially of about 99.63–99.77 weight percent of a ceramic precursor material consisting essentially of about 98.76 weight percent barium titanate, about 0.85–1.69 weight percent niobium pentoxide, and about 0.20 weight percent cobalt oxide, said precursor material mixed with about 0.13–0.17 weight percent niobium pentoxide, and about 0.10–0.29 weight percent manganese carbonate.

4. The ceramic composition of claim 3 wherein the barium titanate has a purity of about 99.0 weight percent, the niobium pentoxide has a purity of about 99.0 weight percent, the cobalt oxide has a purity of about 70% to 74 weight percent in terms of metallic cobalt and the manganese carbonate has a purity of about 99.0 weight percent.

5. A sinterable ceramic composition consisting essentially of a 99.77% weight ceramic precursor material including 98.76 weight percent barium titanate, 1.17 weight percent niobium pentoxide, 0.20 weight percent cobalt oxide, and 0.10% to 0.29 weight manganese carbonate.

6. A ceramic composition according to claim 5 in which the purity of the barium titanate exceeds 99.0 weight percent, the purity of the niobium pentoxide is about 99 weight percent, and no individual impurity is present in an amount greater than about 0.5 weight percent.

7. A sintered ceramic composition having a dielectric constant that ranges from about 3,000–4,000, a dissipation factor of less than 1.8%, an insulation resistance times capacitaence product of greater than 10,000 ohm-farads at 25° C. and greater than 1,000 ohm-farads at 125° C., and a capacitance which varies less than plus or minus 15 percent from its reference value at 25° C. over a temperature range of −55° C. to 125° C. consisting essentially of about 99.63–99.77 weight percent of a ceramic precursor material including about 98.76 weight percent barium titanate, about 1.04 weight percent niobium pentoxide, and about 0.20 weight percent cobalt oxide, said precursor mixed with about 0.13–0.17% weight niobium pentoxide, and about 0.10–0.29% weight manganese carbonate.

8. A multilayer ceramic capacitor comprised of the ceramic compositions of any one of claims 1 through 4, and cofired with electrodes comprising at least one metal selected from the group consisting of silver, gold, platinum and palladium.

9. A multilayer ceramic capacitor comprised of the ceramic composition of claim 5 and cofired with electrodes comprising at least one metal selected from the group consisting of silver, gold, platinum and palladium.

10. The ceramic composition of claim 6, which is sintered at about 1290° C. to 1370° C. for about one to four hours.

11. The sintered ceramic composition of claim 10, in which the purity of the barium titanate exceeds 99 weight percent, the purity of the niobium pentoxide is about 99.9 weight percent, and no individal impurity is present in an amount greater than about 0.5 weight percent.

* * * * *